Aug. 10, 1943.  W. J. BLANCHARD  2,326,430
PROPELLER MANUFACTURE
Filed June 14, 1940  3 Sheets-Sheet 1
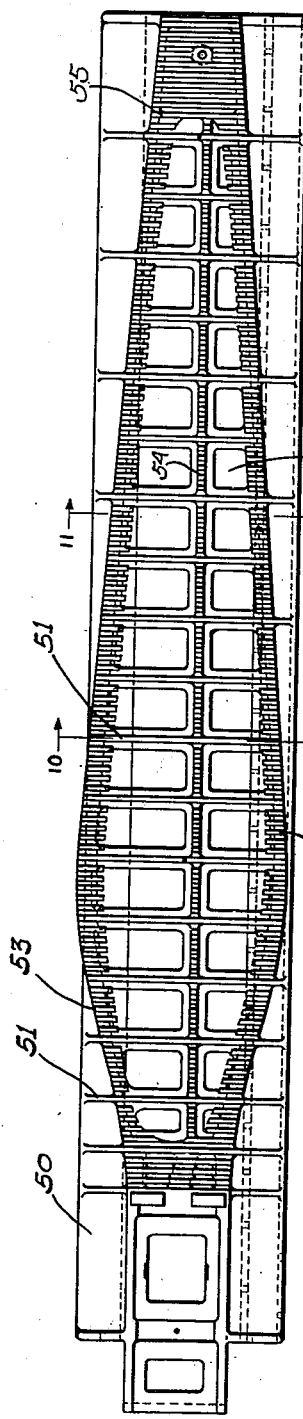
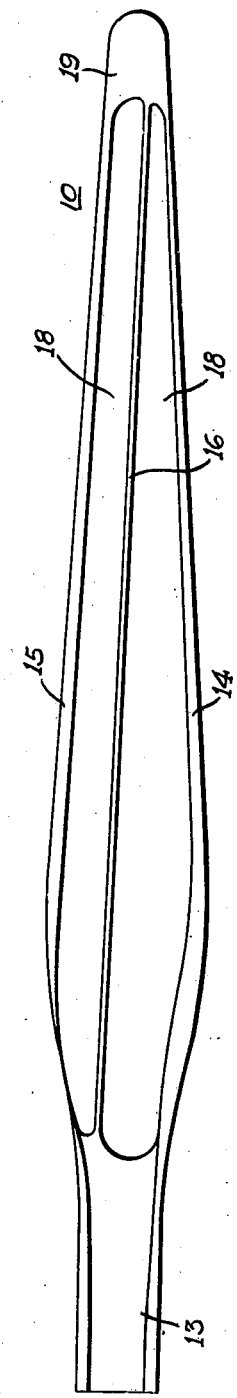
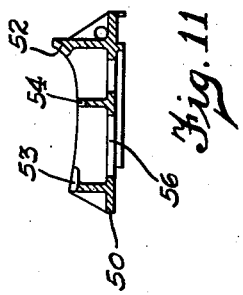
Inventor
Werner J. Blanchard
Maréchal & Noe
Attorneys Aug. 10, 1943.   W. J. BLANCHARD   2,326,430
PROPELLER MANUFACTURE
Filed June 14, 1940   3 Sheets-Sheet 2

Inventor
Werner J. Blanchard
By
Marechal & Noe
Attorneys

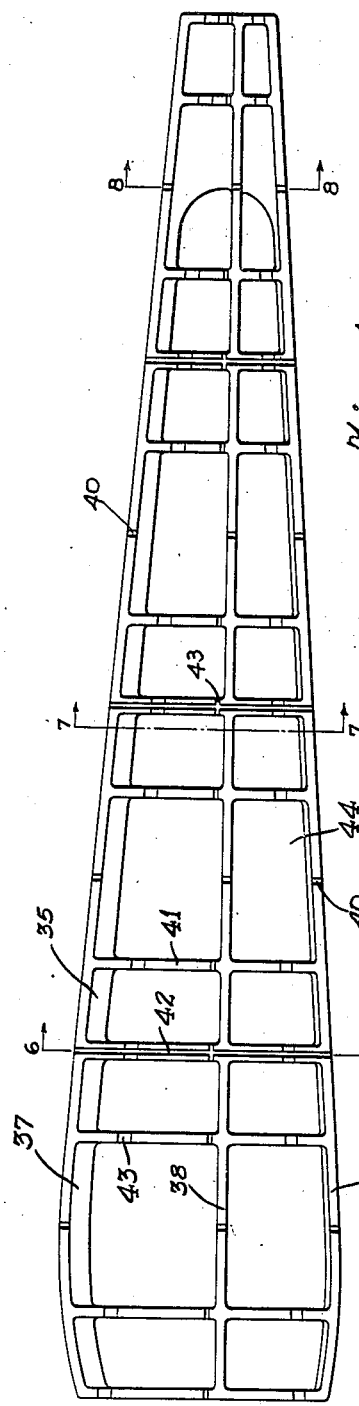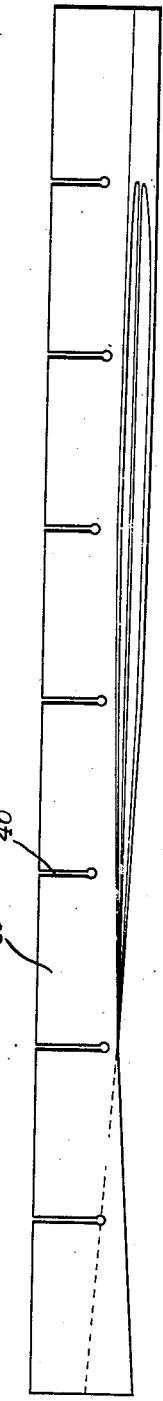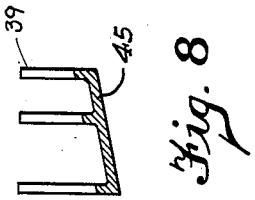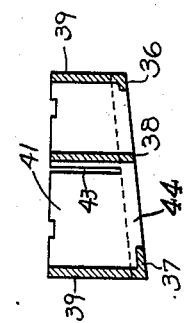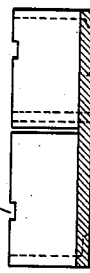

Patented Aug. 10, 1943

2,326,430

UNITED STATES PATENT OFFICE 2,326,430

PROPELLER MANUFACTURE

Werner J. Blanchard, Dayton, Ohio, assignor, by direct and mesne assignments, to General Motors Corporation, Detroit, Mich., a corporation of Delaware Application June 14, 1940, Serial No. 340,615

3 Claims. (Cl. 113—99)

This invention relates to propeller manufacture and more particularly to apparatus for the manufacture of hollow metal propellers for aircraft and the like.

It is a principal object of the invention to provide an apparatus for use in a process for the manufacture of hollow propeller blades in which sections of the blade are intimately secured or bonded together under predetermined conditions of temperature and pressure during which they are protected and supported against tendency to collapse or to deform so that a predetermined shape is maintained throughout the forming operations in a simple and highly effective manner.

It is a further object to provide an apparatus for use in a process of forming hollow steel propeller blades in which the blades are heated to a high temperature and in which an insert or core member is provided within the hollow of the blade for giving support to the sections of the blade during the bonding operations, and for controlling the cooling characteristics thereof, to avoid objectionable displacement, flattening or distortion thereof.

It is a further object to provide an apparatus in which the blade is so supported during the application of heat and pressure thereto that a desired distribution of the pressure is made effective through the areas of the leading and trailing edges where the two sections are brought into contact with each other to thereby secure a firm and intimate interbonding thereof such that the blade will withstand the high stress conditions to which it is subject during use.

It is a still further object to provide an apparatus for use in a brazing process for securing together two sections of a hollow steel propeller blade in which the blade is supported during the process against the forces tending to produce deformation and in which provision is made for controlling the location and distribution of the copper or other bonding material.

Other objects and advantages will be apparent from the following description, the accompanying drawing, and the appended claims.

In the drawings—

Fig. 1 is a plan view looking down upon one of the sections of a blade adapted to be utilized in the process of the present invention;

Fig. 4 is a plan view of the upper clamp or holding member for receiving and supporting the blade during the application of heat and pressure thereto;

Fig. 5 is a side elevational view of the clamp member of Fig. 4;

Fig. 6 is a cross sectional view on the line 6—6 of Fig. 4;

Fig. 7 is a cross sectional view on the line 7—7 of Fig. 4;

Fig. 8 is a cross sectional view on the line 8—8 of Fig. 4;

Fig. 9 is a plan view of the lower cooperating clamp mmeber for holding the blade during the application of heat and pressure thereto;

Fig. 10 is a cross sectional view on the line 10—10 of Fig. 9;

Fig. 11 is a cross sectional view on the line 11—11 of Fig. 9; and

Figure 2:
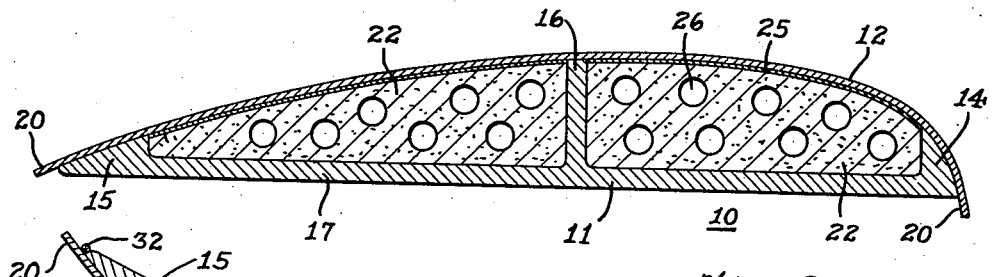
Fig. 2 is a cross sectional view through the blade showing the two sections thereof in assembled position and with the core material filling the hollow cavities of the blade.

Reference is made to applicant's prior Patent 2,205,132 granted on an application filed June 10, 1936, which discloses a hollow steel propeller blade. The present invention relates to the manufacture of such propeller blades, and while it may be utilized in the manufacture of other types of blades, it is of particular application to the making of blades such as disclosed in said patent, and accordingly will be described hereinafter, for purposes of illustration, with reference to blades of the type covered by said patent.

In the manufacture of metal propeller blades and more particularly hollow steel blades made of a plurality of assembled sections, it is highly important to provide for securing a firm and intimate interbonding of the sections, and without producing internal weakening or strains such as might result in the failure of the blade under the high stress conditions to which it may be subject in use. In processes involving operations of the nature of brazing or welding, the metals are subject to stress and deformation under the temperatures and pressures involved in the processing thereof, and it has been found that this may result in distortion of the blade, in the flattening of the faces thereof, or in otherwise deforming the hollow interior portions thereof unless proper provision is made to avoid such deformation. If such deformation does exist in the blade after the sections thereof are bonded or united together, it may require cold working or other subsequent treatment to overcome such condition, it being desirable to avoid substantial reworking of the formed blade both from the standpoint of economy in manufacture and from the standpoint of the quality and strength characteristics of the finished product.

In accordance with this invention two sections of the blade are first formed, of such shape and arrangement that when assembled together, they form substantially the final shape and contour of the blade. These two formed sections are united and initimately bonded by an operation which reduces or eliminates objectionable distortion so that the asesmbled blade following the bonding treatment which unites the two sections is substantially in final desired form, and with merely trimming and usual finishing operations, is in a completed and finished state. Thus the reworking of the blade after it has been assembled to an integral unit and the problems arising from such reworking are largely or entirely avoided.

Referring to the drawings which illustrate a preferred embodiment of the invention, a blade such as may be made in accordance with the present invention is shown generally at 10. While it may have various forms, that illustrated is formed of a main section 11 forming the thrust face and an auxiliary section 12 forming the camber surface. The main section is formed, preferably by forging and hot working operations, with a hollow root portion 13 and with a marginal rib 14 extending above the thrust face and on the side opposite thereto along the leading edge, and a corresponding marginal rib 15 along the trailing edge of the blade. Depending upon the size of the blade, there may be provided in addition one or more intermediate ribs 16, formed integrally with the main section, and projecting above the thrust face 17 to a distance such as to substantially correspond with the camber outline of the blade in that area. It will be understood that the blade sections are properly tapered as desired throughout their length and that a proper helix angle and suitable blade form are provided in accordance with the particular airfoil contour desired. The ribs also delimit longitudinally extending cavities 18 extending from the hollow root portion substantially to the outer end of the blade, the blade as shown having the cavities tapering out at the outer end, leaving a solid tip portion 19.

The section 12 of the blade is in the form of a sheet or plate-like part formed substantially to the camber outline of the blade and adapted to be applied over the main section in contact with the intermediate and marginal ribbed portions and with the tip portion thereof, to thereby enclose and form the complete airfoil contour of the blade. It will be clear from the showing in Fig. 2 for example that the camber sheet thus overlies and is in contact with the intermediate and marginal ribs for a substantial area along the leading and trailing edges of the blade. Also it is preferred to form the camber plate 12 with extended portions 20 adapted to project beyond the thrust face at the leading and trailing edges, and to be later trimmed off after the bonding of the camber plate in assembled position has taken place.

In order to provide for properly forming the blade and securing the intimate interbonding of the two sections together in the absence of objectionable distortion and deformation, the main section 11 is first placed with its ribbed side facing upwardly, substantially as shown in Fig. 2, and a core or cores 22 inserted into the cavities thereof to substantially fill the same. These cores may be made of core material such as utilized in coring practice for casting ferrous alloys, and comprising generally a moldable granular material adapted to be formed and baked to a predetermined size and shape. A suitable material which has been found to produce satisfactory results is a silica core sand containing sharp sand particles, silica flour, and linseed oil. The oil serves as a binder for the core when in the green state, and the silica flour serves to form a proper binder in the final baked state, the sharp sand particles affording substantial surface and facilitating the bonding of the mass into a solid core.

The cores may be separately formed in a core box, having the proper size and shape to produce cores adapted to fit within the blade cavities, the cores being baked or cured, and then inserted in the blade sections in the position shown in Fig. 2. Alternatively, the blade itself may be utilized to function as a core box so that the core may be baked in place. For this purpose, an auxiliary filler or fillers 25 may be placed against the inner surface of one of the blade sections and the two sections then assembled in their final form, and temporarily secured together by means of suitable clamping members or the like. The hollow cavities are then filled with the core material introduced through the hollow root portion, the material being tamped or packed in place to obtain a complete filling with the absence of voids. It is important to provide for the expansion of the core material during the curing operation, and for this purpose there is preferably introduced the auxiliary filler member 25, adapted to be received in the cavity and of suitable thickness to provide a clearance, for example of the order of a sixty-fourth of an inch, to permit of the expansion of the core material during the baking thereof.

Also in order to provide for the venting of the core during the heating, a series of passages 26 are preferably formed therein by suitable means such as the provision of tubes which may be withdrawn from the interior of the core through the hollow root portion following the baking operation. If desired these venting passages may be formed by inserting fillers of beeswax or the like which will melt out during the heating operation.

After the cores are packed and formed in the final state within the blade sections themselves, the camber plate 12 and auxiliary filler member or members 25 are removed, exposing the surface of the core as thus held within the main blade section. The exposed corners of the cores are then trimmed off or cut out at 30 adjacent the bounding ribs of the thrust plate.

In order to provide for securing the two sections of the blade together, it is preferred to utilize a brazing operation, incorporating the use of a bonding material adapted to melt and flow into the joints between the two blade sections and form a homogeneous and intimate bond therebetween. It is important to provide for the control of the flow of the bonding material, to restrict it to substantially the area adjacent the joints of the two main sections, thereby assuring the supplying thereof to the full area of such joints, and avoiding unnecessary and undesirable distribution of such material elsewhere. In accordance with the present invention the cores, in addition to preventing objectionable deformation taking place in the sections of the blade, may also serve to control the distribution of the bonding material, and for this purpose the material is preferably located in predetermined position with respect to the joints, and where it may be maintained in proper relation thereto by the cores.

Figure 3:
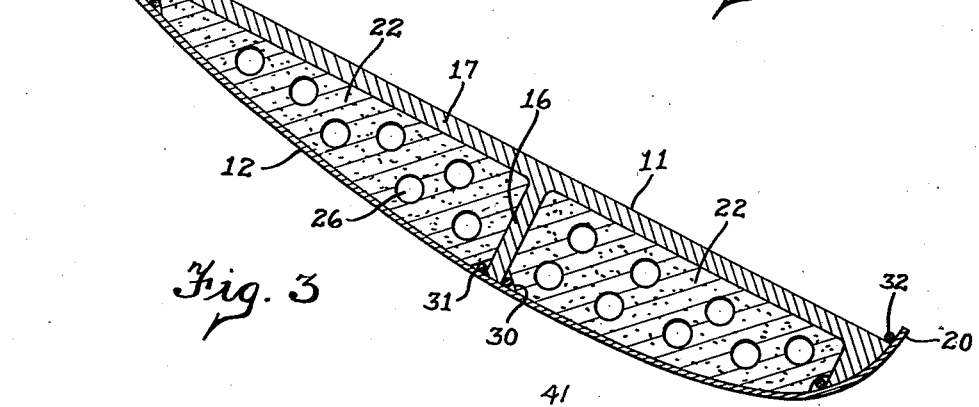
Fig. 3 is a cross sectional view similar to Fig. 2 but showing the blade in condition to undergo the brazing operation.

A suitable material for use as the bonding agent and one having a high enough melting point to permit heat treating in subsequent operation without deleteriously affecting the bond and adapted to form a strong and intimate interbonding of the two metal surfaces is a good grade of copper, such as a copper wire or the like. For instance satisfactory results have been secured with the use of a substantially pure or "deoxidized" copper wire of about No. 10 size. In order to provide for control of the location of such material, the cores are preferably provided with the before mentioned cut-out or trimmed-off channel areas 30 in the zone immediately adjacent the edges of the ribs, and where the joints of the two sections will occur. Thus as shown in Fig. 3, these channels are located at the inner faces of the marginal ribs, and at both outer faces of the intermediate rib. The copper material is shown in place at 31, it having been so placed prior to reassembly of the blade sections, and it will be clear from this view that the core thus serves to confine and restrict the same to the zone immediately adjacent the joints. There may also be provided additional supplies of the copper material at the outer joints of the leading and trailing edges as indicated at 32. Channels 30 may be readily formed by trimming off a corner of the core throughout the length thereof after the baking has taken place; or if desired filler strips may be included and the channels molded in the core material in the initial stages of formation thereof.

The blade is now in condition to undergo the treating operations, and for this purpose is supported and clamped in position by a pair of clamp members of the following description. The upper clamp member 35 is shown in Figs. 4 to 8, and comprises a framework of predetermined size and shape to fit over the upper part of the blade. As will be brought out more clearly hereafter, the blade is preferably substantially inverted with the chamber side lowermost, and hence the lower face of member 35 corresponds substantially with the thrust face of the blade.

Clamp member 35 consists of a framework, made in one or more parts, and formed with a marginal rib 36 corresponding with the leading edge of the blade and another marginal rib 37 corresponding with the trailing edge of the blade. There is likewise provided an intermediate rib 38 in position to lie substantially in alignment with the intermediate rib 16 of the blade. Extending upwardly from these lower ribbed portions are web 39 which are slotted as shown at 40 at suitable intervals to provide for the expansion and contraction which occurs under the heating to which the fixture is subjected. Cross ribs 41 are likewise provided at frequent intervals, to form a secure and rigid structure, the cross ribs preferably having both transverse and longitudinal slots 42 and 43 respectively, to reduce the mass thereof and to properly control the expansion characteristics thereof. As will be clear from Figs. 6 and 7, the cross ribs 41 extend across the bottom of the clamp member in such position as to provide for applying pressure to the blade, the ribs however being spaced apart to leave apertures 44 of substantial size, to both reduce the mass of the fixture and to provide more ready access to the heating medium thereto. At the outer end of the fixture where the solid tip portion 18 of the blade is received, a solid web 45 is provided in the fixture for giving continuous and uniform application of pressure to the tip portion of the blade.

The lower fixture for clamping and supporting the blade is shown at 50, and comprises a ribbed apertured structure of suitable size and shape for receiving the camber side of the blade therein. Thus as shown this fixture includes a series of spaced ribs 51, located at frequent intervals throughout its length, and extending to provide continuous support for the blade across its transverse dimension. In addition there are preferably provided a series of short supporting ribs 52 and 53 at the zone of the leading and trailing edges, respectively, and intermediate rib 54, the ribs preferably extending only part way across the transverse dimension of the blade, to afford additional support while at the same time maintaining adequate access for the heating medium to the entire blade. At the outer end, in the zone of the tip portion 19 of the blade, the ribs 55 extend across the whole face of the blade so that the entire tip portion may be properly supported and subjected to pressure, the sections being relatively thin in this area and capable of being brought into close overlying contact with each other so that a relatively small quantity of bonding agent may distribute itself over substantially the entire overlapping area thereof and thus firmly secure the tip portion into an integral unit. Such access of the heating medium is also facilitated by reason of the spaces 56 between the ribs which are open through the fixture and if desired the ribs 51 may be formed with cut-out portions 57 to reduce the mass thereof and further facilitate access of the heating medium. As shown in Figs. 10 and 11, the sections of the lower fixture are shaped throughout its length to correspond with the varying camber outline of the blade. Also as above described, this lower fixture may be formed as a single member or in sections adapted to be joined together for use. The fixture members may be constructed of a suitable temperature-resistant material which will maintain its essential shape at the high temperature conditions to which it is subject.

Figure 12:
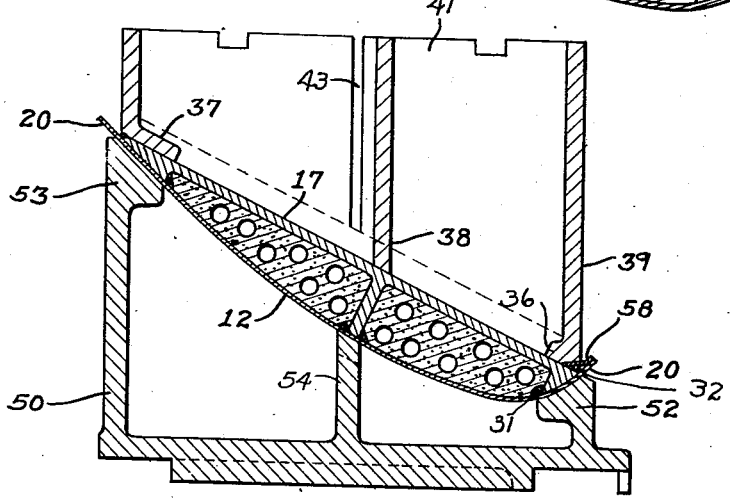
Fig. 12 is a view showing the blade with the core thereof in position within the clamping means and ready to be heated for performing the bonding operation.

These two fixtures serve as clamping members for holding and retaining the blade in proper supported position during the application of pressure thereto while in a highly heated condition. For this purpose the blade is mounted between the two clamping members, with the camber face generally downward, and preferably inclined for the greater portion of its length toward the leading edge of the blade, as shown for example in Fig. 12. The vertical dimensions of the webs 39 on the leading and trailing edges of the upper clamp 35 and the corresponding parts on the lower clamp 50 are suitably arranged to afford the desired degree of tilt of the blade when held in position therein, it being understood that this vertical distance necessarily changes at different points on the blade corresponding to the particular helix angle thereof. The clamping members 35 and 50 are preferably constructed as required to secure the desired angular position of the blade and if desired a waste strip 58 may be temporarily secured to the upper face of the blade adjacent the leading edge in substantially the position shown in Fig. 12 to prevent the lateral shifting of the clamps and to facilitate the application of proper pressure to the leading edge of the blade. This strip 58 may be secured in position by spot welding and trimmed off in the finishing operations along with the projecting ends 20 of the camber plate, the leg 36 of the upper clamping member being suitably notched as shown to receive said strip. It has been found desirable to support the blade in this general position in order to provide for the downward flow of the molten bonding material, toward and into the joint between the blade sections, and likewise in order to provide for applying pressure to the intermediate rib, and especially to the marginal ribs. Thus it will be seen by reference to the drawings that it is necessary to direct the force in divergent angles in order to properly apply pressure in a direction normal to both the leading rib 14 and the trailing rib 15. And by supporting the blade in the general angular relationship shown, it is found that this application of pressure is facilitated, making it easier to secure application of the desired pressure to both edges of the blade. Also if desired the entire blade may be given a downward tilt toward the tip end thereof, such as to assure the flow of any bonding material toward the joint at the tip to secure a firm and intimate interbonding thereof.

The blade while held in the fixtures is heated, for example by means of an electric furnace, to a sufficiently high temperature to cause the melting and flowing of the bonding material. Where copper is used for this purpose, it has a melting point of approximately 1985° F., and the entire blade is then heated to a temperature just above this value, or about 2000° F. At this high temperature, the steel sections of the blade though not molten are themselves softened and subject to deformation under even a moderate pressure, and hence the actual pressure which is utilized in accordance with this invention is relatively low so as to avoid producing serious deformation in the blade sections themselves. As an example of pressures which have been found satisfactory for use in accordance with this invention, the weight of the upper clamping member 35 has been so regulated as to provide for applying approximately 50 pounds of weight per running foot of length, resulting in a contact pressure of about six pounds per square inch of contact area. While the pressure may be increased somewhat, to the order of 10 to 12 pounds per square inch, or even somewhat higher, it is preferred to keep the pressures relatively low and thereby reduce the tendency toward deformation which might otherwise occur in the blade. It is found that by the proper initial forming of the parts, the gaps at the joints between the two overlapping sections of the blade may be maintained quite small, and where of the order of approximately .003 to .005 inches, the bonding material may be made to function to provide a firm and secure interbonding of the two sections into an integral unit.

The cores have been found to reduce the tendency for the leading and trailing ribs to move toward each other when they are in the highly heated and softened condition, which tendency is otherwise exhibited in their softened condition under the pressure to which they are subjected by reason of their contact with the camber plate and the clamping members. Also the thrust face web portion 17 of the main blade section is maintained in predetermined desired contour, and the tendency for the contour to change is controlled and overcome. And as above described, the cores additionally provide for controlling the flow and distribution of the bonding material, making it available immediately at the zone of the joints, and maintaining it in such joints so that it is practically all restricted to that area.

After the proper temperature has been attained and the bonding agent has flowed into the joints and performed the desired interbonding relationship the blade may be cooled, being either withdrawn from a furnace operating on a batch basis, or passed through a furnace operating on a continuous basis. It is desired to effect a heat treating operation, in order to develop the proper temper of the blade, and particularly in the case of a continuous operation, this may be readily effected by cooling the blade to a temperature below the critical treating temperature for that particular material, and then reheating to a proper temperature for the heat treating operation. Satisfactory results have been secured where the blade was reheated to a temperature of approximately 1500° F., after having been allowed to cool to room temperature; a similar temperature of heat treatment is desirable for use in the absence of complete intermediate cooling.

The blade is then quenched, preferably in an oil bath, and while still being held in clamping fixtures such as above described, although it may if desired be removed from the fixtures and quenched separately. It is desired, in order to avoid introducing distortion and deformation into the blade as a result of differential cooling, to provide for dipping the blade edgewise into the quenching bath, and with the tip end being inserted first. Preferably the leading edge of the blade is inserted first, so that the blade cools rapidly from both sides and thus differential cooling and resulting permanent set of the blade are eliminated.

It is found that the presence of the cores within the blade during the heat treating operation is desirable as providing for more uniform rates of cooling or chilling of the two opposite sides of the blade. Particularly in the case of a blade having dissimilar sections on its opposite sides as described herein, the tendency toward differential cooling and the distortion which would otherwise result therefrom, are largely overcome because the cooling characteristics of the blade more nearly approach those of a solid section and the differential effects are thereby minimized and rendered unobjectionable.

The blade is now given its final tempering treatment by being reheated to a suitable temperature as desired for securing the proper strength and hardness characteristics. Either just before this step or following thereupon, the cores may be removed by agitating the blade to break up the cores, which are then withdrawn from the root end of the blade through the hollow portion 13 thereof. And as above described, by reason of the carrying out of the process in the manner set forth, it is found that the blade is in substantially final desired form, and that by trimming the blade, and conducting the usual finishing operations thereto, it is in substantially completed form. Thus a highly satisfactory manufacturing operation is provided, making it possible to produce the blades simply, rapidly, and inexpensively, and in addition the additional stresses and difficulties arising from reworking of the blade following the uniting of the sections together, are not encountered.

While the process and form of apparatus herein described constitute preferred embodiments of the invention, it is to be understood that the invention is not limited to this precise process and form of apparatus, and that changes may be made therein without departing from the scope of the invention which is defined in the appended claims.

What is claimed is:

1. Apparatus for the manufacture of hollow steel propellers from two formed sections adapted to be applied in overlying relation to each other at their edges to form the airfoil contour of the blades, comprising in combination, a clamp member consisting of a framework, formed with marginal ribs corresponding with the overlying edge portions of the sections, and cross ribs at intervals connecting one marginal rib with another, webs extending from the ribs and cross ribs to end in a common plane, said frame being contoured on the side opposite said plane to a surface for engagement with a section of the blade in final form, in which the marginal ribs engage the overlying portions of the sections and the cross ribs engage the section spanning the space between the overlying portions, said webs being slotted to provide for expansion and contraction during temperature changes in processing the blade.

2. In apparatus for the manufacture of a hollow steel propeller blade from two formed and worked metal sections, one of which forming the thrust section contains intermediate and marginal ribs defining longitudinally extending cavities therebetween, and the other of which defining the camber section consists of a sheet-like member adapted to be received over said other member in contact with said intermediate and marginal ribbed portions, a fixture for supporting the assembled metal sections during processing of the blade, comprising in combination, a pair of frame members each having a surface contoured to fit the profile of the finished blade section, and webs extending away from the contoured surface to end substantially in a plane, each of said frame members providing intermediate and marginal ribs on the contoured surface extending the length thereof adapted to engage the respective blade section over the mutually contacting portions of said sections, and cross ribs spaced along the length of the frame to span the space between the intermediate and marginal ribs of the frame adapted to engage the respective blade sections along lines spaced lengthwise of the blade and extending from one marginal rib to another, said frame members being apertured between the longitudinal ribs and cross ribs to both reduce the mass of the fixture and to provide more ready access of heating medium to the surface of the blade sections.

3. The combination set forth in claim 2 wherein, each of the intermediate and marginal ribs of one of the frame members is provided with a series of short transversely extending and closely spaced ribs to afford additional support while at the same time maintaining adequate access for the heating medium to the blade.

WERNER J. BLANCHARD.